INVENTOR
ALBERT MEYER
William H. Bruning Agent
BY Hurvitz, Rose & Greene
ATTORNEYS INVENTOR
ALBERT MEYER
BY William H. Brennig, Agent
Harntz, Rose & Greene
ATTORNEYS United States Patent Office 3,499,090
Patented Mar. 3, 1970

3,499,090
ELECTRONIC ORGAN FREQUENCY DIVIDING SYSTEM EMPLOYING DIVISION BY ODD NUMBERS

Albert Meyer, Cincinnati, Ohio, assignor to D. H. Baldwin Company, Cincinnati, Ohio, a corporation of Ohio Filed Feb. 28, 1967, Ser. No. 619,323
Int. Cl. G10h 5/06
U.S. Cl. 84—1.01 17 Claims

ABSTRACT OF THE DISCLOSURE

Twelve master oscillators, producing square wave forms or sawtooth wave forms, are connected each in a divide by two frequency divider chain, to provide one tone generator of conventional character in electronic organs. The master oscillator frequencies are also divided by three for sub-master oscillators, from which new octavely related tones may be derived each by means of a divide by two frequency divider chain. The frequencies obtained by division by three are further divided by three for further sub-master oscillators, each of which again controls a divide by two frequency divider chain, to provide a third set of tones. The last mentioned sub-master oscillator frequencies, obtained by division by three, are further divided by five and the still further sub-master oscillator frequencies provided by that division again control divide by two frequency dividers to produce further octavely related tones. Thereby four relatively detuned tone generators are provided, all of which derive from twelve master oscillators by means of frequency division, so that only twelve tuning controls are required for an organ which includes four tone generators.

Background of the invention

It is conventional in electronic organs to provide multiple tone generators, which are detuned with respect to some nominal pitch standard. Each generator commonly includes a set of master oscillators, subject to tuning. Thereby, the relative frequencies of corresponding tones in the several generators are selected according to the whim or caprice of an organ tuner, when the organ requires retuning after having left the factory. The system of the present invention starts with twelve master oscillators, one for each nomenclature of the musical scale. From the master oscillators, plural tone generators can be controlled by successive frequency division by an odd number, so that on tuning the twelve master oscillators all the generators provide accurately predetermined frequencies throughout, at frequencies slightly detuned with respect to nominal equally tempered tuning.

Attention is invited to U.S. patent to Leslie, No. 3,251,-924, issued May 17, 1966, which discloses an alternative solution to the problem solved herein.

The Leslie system requires that basic tone generators provide sinusoidal wave forms, since detuned wave forms are derived in the system by means of frequency shift modulators, which do not produce constant frequency shifts on a cents basis, but only on an absolute basis. Harmonic rich tones are then derived from the basic tone generators, and also from the modulators, by means of non-linear devices responsive to the sinusoidal wave forms.

In the present system, in distinction to the Leslie system, the basic tone generators are either sawtooth wave generators or square wave generators, or, more generally, involve harmonic rich wave forms, and the detuned wave forms are also complex, so that separate harmonic generators are not required. Because new frequencies are derived only by frequency division, as distinct from frequency shift modulation, all frequencies are shifted by a constant number of cents.

Further, frequency division devices are simple and economical, whereas frequency shift modulators are relatively complex and costly.

Summary of the invention

The invention involves a multiple generator electronic organ which employs twelve master oscillators from which all tones are derived exclusively by frequency division, the several generators being offset in frequency with respect to one another by predetermined musically useful amounts. To accomplish this end, generators are employed which derive from the master oscillators by one or more frequency divisions, by an odd number, such as 3, 9, 15, 27, 45. Following the latter frequency divisions, or each of these, octavely related notes are derived by a divider chain which divides by two per stage. If, then, the master oscillators are assumed to have (1) 0¢ relative tuning, it can be shown that three additional generators can have (2) —1.96¢, (3) —3.92¢ and (4) +9.76¢ relative tuning, corresponding to division by 3, 9 and 45. For flute celeste, use may be made of (3) and (4), and for string celeste of (1) and (4), for example only.

It is also feasible to employ tapered celeste, i.e., by using (3) and (4) in one octave, (2) and (4) in the next higher octave, and (1) and (4) in the next higher octave. For further teachings relative to tapered celeste, reference is made to a co-pending application, assigned to the same assignee, in the name of Thomas W. Cunningham, Ser. No. 509,747, filed Nov. 26, 1965, now issued as U.S. Patent 3,450,825.

By detuning the master oscillators with respect to normal tuning, i.e. A=440 c.p.s., say by —2¢, a set of generators for +2¢, 0¢, and 2¢ and +10¢ (approximately) may be derived, and in general any one of the generators may be normally tuned. The crucial point is operation on slaved master oscillators by means of frequency division by an odd number with respect to only twelve tunable master oscillators. Within each generator division is by two, to provide octavely related tones. Available odd division ratios are then 3, 5, 9, 15, 27, 45, with respect to the tunable master oscillators. The master oscillators themselves may be normally tuned or relatively detuned, giving rise to an extensive gamut of both + and — relatively detuned slaved generators, as may suit the designer of the organ. Tapered tuning is then available to enhance the effects, i.e., selection of tones from diverse generators for a given tone color.

Description of the preferred embodiments

Figure 1:
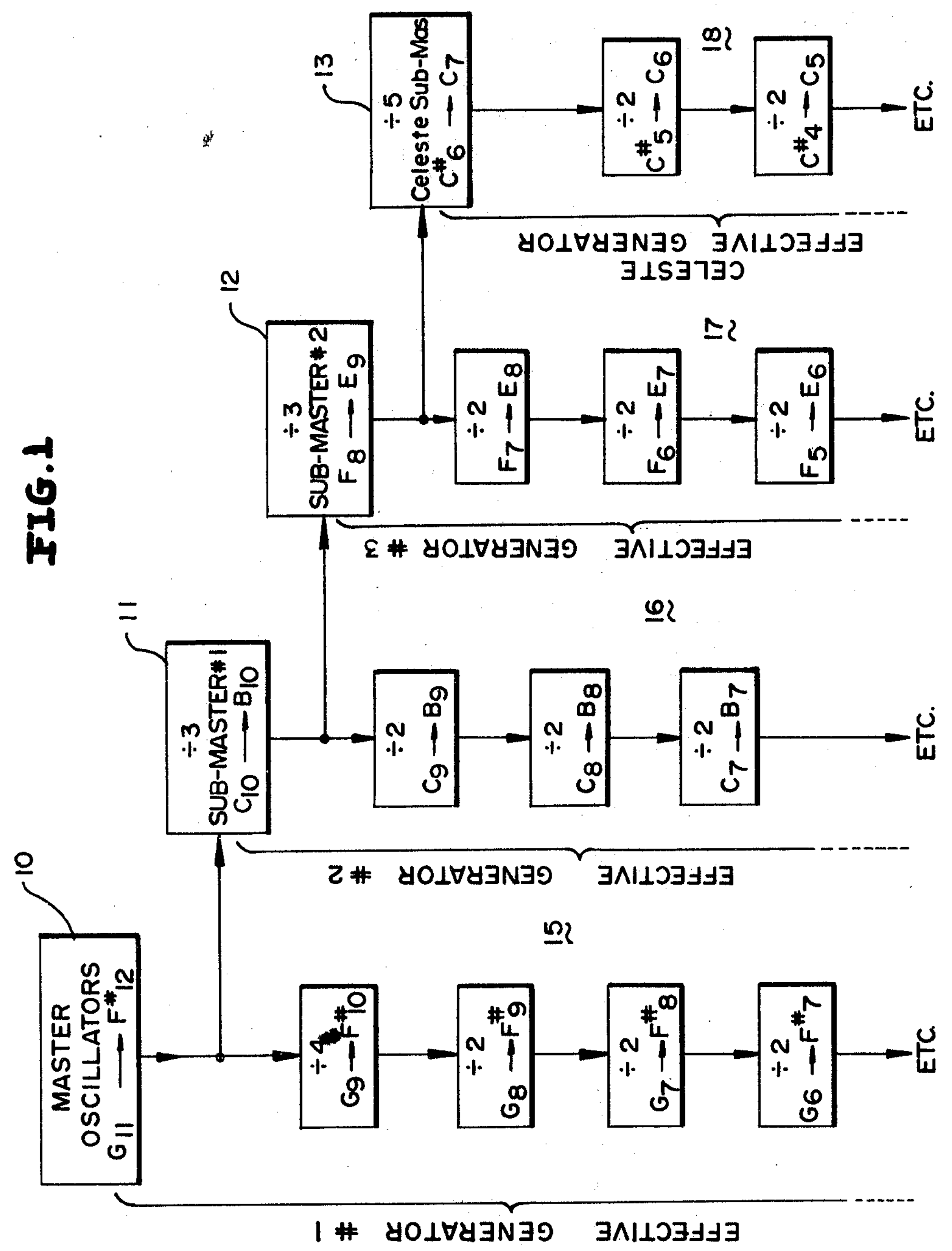
FIGURE 1 is a block diagram of a system according to the invention.

Referring to FIGURE 1 of the accompanying drawings, 10 represents a set of twelve tunable master oscillators, representing the notes G11 to F♯12. The oscillators may be of complex wave form, and normally would be of square wave form or sawtooth wave form in a typical electrical organ. The outputs of oscillators 10 are applied to ÷3 frequency dividers 11, on a one for one basis, so that these frequency dividers become slaved sub-master oscillators. Any desired form or type of frequency dividers may be employed, and particularly those disclosed in application for U.S. Patent No. 511,037 to Edward M. Jones, filed Dec. 2, 1965, and assigned to the assignee of the present application. The outputs of dividers 11 are applied to further ÷3 frequency dividers 12, and these in turn to ÷5 frequency dividers 13, all to provide one set of master oscillators and three sets of sub-master oscillators or slaved master oscillators.

The particular division values suggested are not crucial, except in that division by an odd number is involved.

In the suggested embodiment, divisions by 3, 9, 45 is suggested. However, values of 3, 5, 9, 15, 25, 27, 45 may be readily available, in terms of one or by successive divisions by factors of 3 and 5.

Calculation shows that if the master oscillators 10 are turned to frequencies appropriate to G11–F♯12, sub-master oscillators 11 will provide frequencies appropriate to C10–B10; sub-master oscillators 12 to F8–E9 and sub-master oscillators 13 to C♯6–C7. However, if master oscillators 10 are normally tuned, sub-master oscillators 11, 12, and 13 are detuned by nearly −1.96¢, −3.92¢ and +9.76¢, hereinafter referred to as −2.¢, −4.¢ and +10¢. In fact, however, the master oscillators 10 may be detuned so that any one of the sub-master oscillators may be normally tuned. For example, if sub-master oscillators 10 provide normal frequencies, oscillators 10 are detuned by +2.¢, sub-master oscillators 12 by −2¢ and sub-master oscillators 13 by +12¢.

From each set of such oscillators extends a conventional ÷2 divider chain, identified by reference numerals 15, 16, 17, 18, to provide octavely related notes. Because C10 (16,744 c.p.s.) is on the verge of inaudibility, above this frequency in the effective divider chains the divisions can profitably be by four, to save dividers. This is, however, a matter of engineering, as is the choice of division factors, and the number of nominal unison and celeste sources provided in a given instrument. In the preferred embodiment a total of three nominal unison generators 10, 15; 11, 16; 12, 17; and one celeste generator 13, 18, have been illustrated.

Having the generators, any techniques available to the organ art may be utilized in keying, tone coloring and radiating audible tones.

Figure 2:
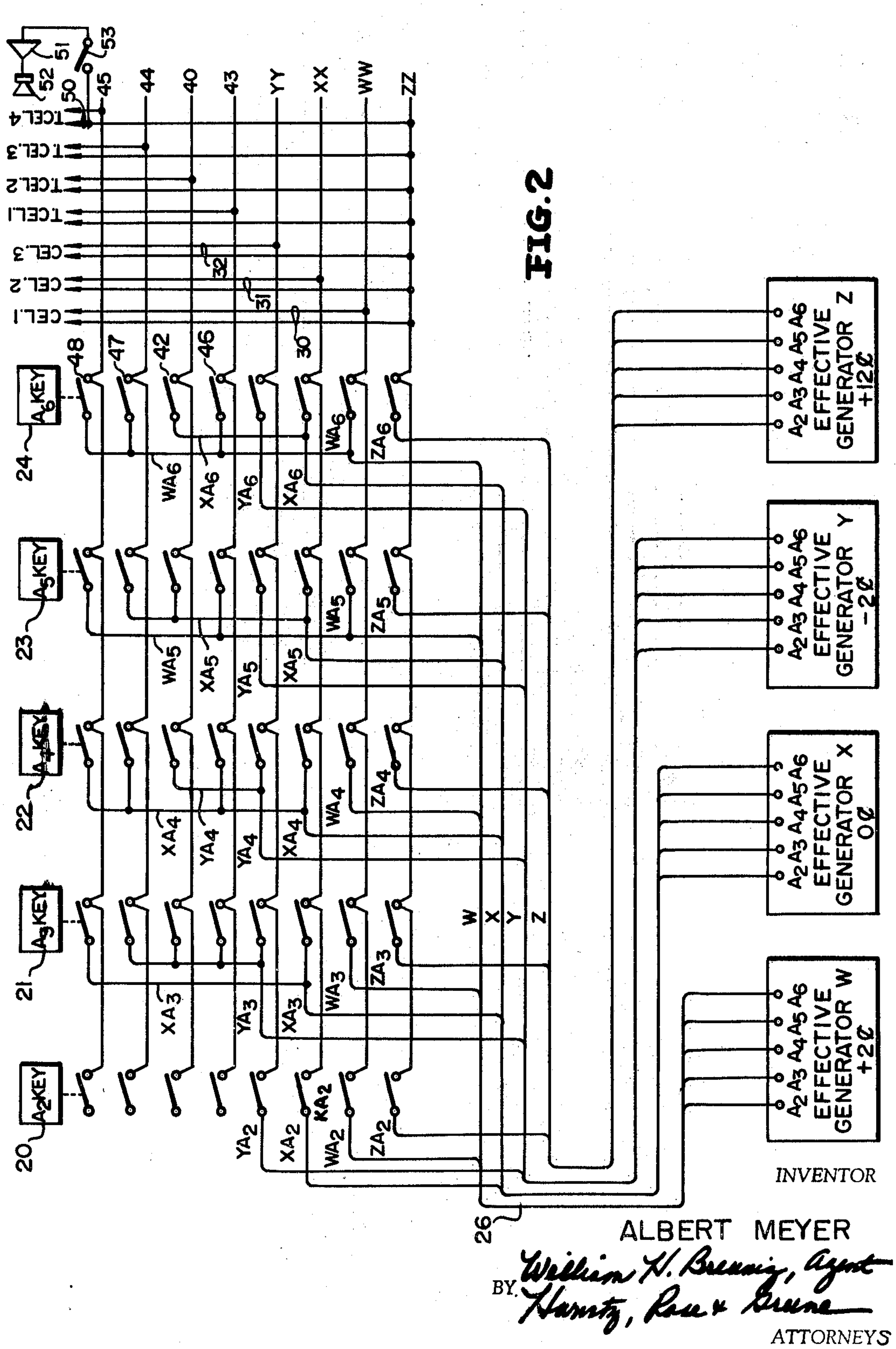
FIGURE 2 is a switching diagram illustrating a feasible implementation of the system of FIGURE 1, for obtaining celeste effects.

In FIGURE 2 is illustrated a portion of an electronic organ according to the invention, pertaining particularly to generation of the note A, for celeste stops. Nominal unison generators W, X, Y and celeste generator Z are provided, each including the notes A2–A6, and separate keys 20, 21, 22, 23, 24 are illustrated for selecting A in the several octaves.

Extending from the W source, via cable 26, is a lead WA2, which supplies a bus WW via key switch KA2. Signals are similarly conveyed to buses YY, XX and ZZ, when A2 key 20 is actuated. If A3 key 21 is actuated A3 signals are conveyed to the buses WW, XX, YY, ZZ, from the several generators W, X, Y, Z, respectively. The four upper key switches actuated by A2 key 20 are blank.

FIGURE 2 now illustrates various celeste detunings which may be obtained, by suitable connections to the WW, XX, YY, ZZ buses, when the A2 key 20 is actuated. By connecting buses WW and ZZ to the tone color filters of the organ, via buses 30, two signals are provided, taken from generators W and Z, which are detuned by +2¢ and +12.¢ so that 10¢ detuned celeste is obtained. This is identified in FIGURE 2 as celeste 1. Leads 31 provide tone signal from generators X and Z, at 0¢ and +12¢ detuning, so that celeste detuning is12.¢. Leads 32 provide tone signal from generators Y and Z, detuned −2¢ and +12¢, respectively, to provide a 14¢ detuned celeste.

Keys such as A6 key 24 provide tone signal from generator X to lead 40, via switch 42, and from generator W, to buses 43, 44, 45 via switches 46, 47, 48. Bus 45 derives tone signal as follows:

| Key: | Tone signal from gen. |
|---|---|
| A2 | — |
| A3 | X |
| A4 | *x* |
| A5 | W |
| A6 | W |

The A notes do not, therefore, derive all from the same nominally unison tuned generators. This gives rise to so-called tapered celeste, i.e., reduced celeste detuning in the upper octaves. For example, leads 50, shown proceeding to an amplifier and tone color filters 51, and loudspeaker 52, via stop selection switch 53, derives its tones from buses ZZ and 45. When A3 key 21 is actuated tones are derived from generators X and Z, providing a 12¢ detuning. When A6 key 24 is actuated, on the other hand, tone selection is from the W and Z generators, providing a 10¢ detuning.

For diverse tone colors, diverse detunings may be employed. For example, for a flute celeste one might use a 14¢ celeste, whereas for a string celeste 10¢ detuning may be more appropriate.

The present invention lends itself to implementation of the optimum generator utilization system, disclosed in my application for U.S. Patent Ser. No. 698,222, now U.S. Patent No. 3,049,959.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. An electronic organ comprising
a plurality of tone frequency dividing generators providing mutually detuned frequencies including
only a single set of twelve tunable master oscillators having at least one chain of frequency dividers coupled thereto, said plurality of frequency dividing generators including
frequency divider chains each having a sub-master oscillator responsive respectively only to said twelve tunable master oscillators.

2. The combination according to claim 1 wherein each divider chains includes a divide by two divider chain.

3. An electronic organ comprising
a plurality of tone generators providing mutually offset frequencies including
only a single set of twelve tunable master oscillators, said plurality of generators consisting of frequency divider chains responsive only to said twelve tunable master oscillators, one of said frequency divider chains including
a divider by three followed in cascade by a sequence of dividers by two.

4. The combination according to claim 3 wherein one of said frequency divider chains includes means for dividing by nine followed in cascade by a sequence of dividers by two.

5. The combination according to claim 3 wherein one of said frequency divider chains includes means for dividing by forty-five followed in cascade by a sequence of dividers by two.

6. The combination according to claim 3 wherein one of said frequency divider chains includes means for dividing by fifteen followed in cascade by a sequence of dividers by two.

7. An electronic organ comprising
a plurality of tone generators providing mutually offset frequencies including
only a single set of twelve tunable master oscillators, said plurality of generators consisting of
frequency divider chains responsive only to said twelve tunable master oscillators wherein at least one division effected by at least one of said divider chains involves division by an odd number.

8. An electronic organ system, comprising twelve master oscillators providing complex wave forms, electronic frequency dividers for dividing the frequencies of said master oscillators by at least one odd number to provide at least a first series of twelve slaved master oscillators, divide by two frequency divider chains connected to each of said twelve master oscillators and to each of said slaved master oscillators to provide octavely related groups of frequencies which are slightly relatively detuned.

9. An electronic organ system according to claim 8, wherein the detuning of the master oscillators with respect to the slave master oscillators is of the order of two cents for notes of corresponding nomenclature.

10. An electronic organ system according to claim 8, wherein the detuning of the master oscillators with respect to the slave master oscillators is sufficient to give rise to celeste effects.

11. The combination according to claim 8 wherein said at least one odd number is three.

12. The combination according to claim 8 wherein said at least one odd number includes three and nine.

13. The combination according to claim 8 wherein said at least one odd number includes three, nine and forty-five.

14. The combination according to claim 11 wherein is provided circuit means for deriving a first group of frequencies from one of said divide by two chains connected to one of said twelve master oscillators, circuit means for deriving a second group of frequencies from one of said divide by two chains connected to one of said at least a first series of twelve slaved master oscillators, and circuit means for combining at least one frequency from said first group of frequencies and at least one frequency from said second group of frequencies to obtain an ensemble effect.

15. The combination according to claim 12, wherein is provided circuit means for deriving a first group of frequencies from one end of said divide by two chains connected to one of said twelve master oscillators, circuit means for deriving a second group of frequencies from one of said divide by two chains connected to one of said at least a first series of twelve slaved master oscillators, circuit means for deriving a third group of frequencies from one of said divide by two chains connected to a second series of twelve slaved master oscillators, and circuit means for combining at least one frequency from said first group, from said second group and from said third group of frequencies to obtain a further ensemble effect.

16. The combination according to claim 13 wherein is provided circuit means for deriving a first group of frequencies from one of said divide by two chains connected to one of said master oscillators, circuit means for deriving a second group of frequencies from one of said divide by two chains connected to one of said at least a first of slaved master oscillators, circuit means for deriving a third group of frequencies from one of said divide by two chains connected to a second series of twelve slaved master oscillators, circuit means for deriving a fourth group of frequencies from one of said divide by two chains connected to a third series of twelve slaved master oscillators, circuit means for combining at least one frequency from said first group of frequencies with at least one frequency from said fourth group of frequencies, circuit means for combining at least one frequency from said second group of frequencies with at least one frequency from said fourth group of frequencies, and circuit means for combining at least one frequency from said third group of frequencies with at least one frequency from said fourth group of frequencies.

17. An electronic organ system comprising an output system a master oscillator, a first divide by two chain of dividers coupled to said master oscillator, a first key switch selectively coupling one of said dividers to said output system for supplying a nominal first frequency thereto, a first odd-number divider coupled to said master oscillator and acting as an ensemble sub-master oscillator, a second divide by two chain of dividers coupled to said ensemble sub-master oscillator, a second key switch selectively coupling one of said last-mentioned dividers to said output system for supplying a second frequency which is octavely related to said first frequency, a second odd-number divider coupled to said master oscillator and acting as a celeste sub-master oscillator, a third divide by two chain of dividers coupled to said celeste sub-waster oscillator, third and fourth key switches selectively coupling two of said last-mentioned dividers to said output system for supplying thereto third and fourth frequencies which correspond respectively in pitch to said first and second frequencies.

References Cited

UNITED STATES PATENTS

| | | | |
|---|---|---|---|
| 3,251,924 | 5/1966 | Leslie | 84—1.01 X |
| 3,300,726 | 1/1967 | Newman | 331—51 X |
| 3,410,948 | 11/1968 | Ishibashi et al. | 84—1.19 X |

HERMAN KARL SAALBACH, Primary Examiner

SAXFIELD CHATMON, Jr., Assistant Examiner

U.S. Cl. X.R.

84—1.17, 1.23; 331—51

UNITED STATES PATENT OFFICE
CERTIFICATE OF CORRECTION

Patent No. 3,499,090 Dated March 3, 1970

Inventor(s) ALBERT MEYER

It is certified that error appears in the above-identified patent and that said Letters Patent are hereby corrected as shown below:

(1) Column 3, line 15, "turned" should be -- tuned --.

(2) Column 3, line 24, "10" should be -- 11 --.

(3) Column 4, line 4, "x" should be -- X --.

SIGNED AND SEALED AUG 18 1970

(SEAL)
Attest:

Edward M. Fletcher, Jr.
Attesting Officer

WILLIAM E. SCHUYLER, JR.
Commissioner of Patents

FORM PO-1050 (10-69)

USCOMM-DC 60376-P69
★ U.S. GOVERNMENT PRINTING OFFICE : 1969 O—366-334